United States Patent
Naqvi (10) Patent No.: US 9,898,926 B2
(45) Date of Patent: Feb. 20, 2018

(54) CONTROL DEVICE FOR CONTROLLING A PLURALITY OF ELECTRONIC DEVICES VIA A PLURALITY OF COMMUNICATION CHANNELS

(71) Applicant: Yamtech, Inc., Bloomingdale, IL (US)

(72) Inventor: Syed R. Naqvi, Bloomingdale, IL (US)

(73) Assignee: Yamtech, Inc., Bloomingdale, IL (US)

( * ) Notice: Subject to any disclaimer, the term of this patent is extended or adjusted under 35 U.S.C. 154(b) by 5 days.

(21) Appl. No.: 15/043,257

(22) Filed: Feb. 12, 2016

(65) Prior Publication Data

US 2017/0236408 A1 Aug. 17, 2017

(51) Int. Cl.
*G08C 17/02* (2006.01)
*G08C 23/04* (2006.01)
*H04B 5/02* (2006.01)

(52) U.S. Cl.
CPC ............. *G08C 17/02* (2013.01); *G08C 23/04* (2013.01); *G08C 2201/20* (2013.01); *G08C 2201/93* (2013.01); *H04B 5/02* (2013.01)

(58) Field of Classification Search
CPC ...... H04B 7/2612; H04B 5/02; H04B 5/0062; G08C 17/02; G08C 19/28; G08C 2201/20; G08C 2201/93; G08C 23/04; H04L 12/2805; H04N 21/441; H04N 21/4104; H04N 21/43615; H04N 21/42218; H04N 21/485; H04N 21/443
USPC ........... 340/10.5, 3.1, 3.7, 3.71, 13.24, 5.22, 340/12.3, 5.1; 348/734; 455/41.2
See application file for complete search history.

(56) References Cited

U.S. PATENT DOCUMENTS

| | | | | |
|---|---|---|---|---|
| 7,586,398 B2 * | 9/2009 | Huang | ................. | G08C 17/02 340/10.5 |
| 8,564,727 B2 * | 10/2013 | Okuda | ................. | G08C 17/02 348/725 |
| 8,830,074 B2 | 9/2014 | Arling et al. | | |
| 8,896,412 B2 | 11/2014 | Kohanek | | |
| 9,020,435 B2 * | 4/2015 | Castillo | ................. | H04B 7/2612 340/5.1 |
| 9,252,848 B2 * | 2/2016 | Hale | ................. | G08C 17/02 |
| 2004/0070491 A1 | 4/2004 | Huang et al. | | |
| 2004/0148632 A1 | 7/2004 | Park et al. | | |
| 2006/0041655 A1 | 2/2006 | Holloway et al. | | |

(Continued)

*Primary Examiner* — Ali Neyzari
(74) *Attorney, Agent, or Firm* — Fiala & Weaver P.L.L.C.

(57) ABSTRACT

Techniques are described for controlling electronic devices via a plurality of communication channels. For example, a control device may undergo a programming process to enable communication between the control device and a particular electronic device via a first communication channel. After programming is complete, the control device is configured to transmit command(s) to the particular electronic device via the first communication channel. The control device is further configured to perform a pairing sequence with the particular electronic device via the first communication channel to enable control of the particular electronic device via the second communication channel. The control device may determine the proper pairing sequence to be performed and monitor whether the user has performed the proper pairing sequence using the control device. Upon successful completion of the pairing process, the control device is configured to transmit command(s) to the particular electronic device via the second communication channel.

20 Claims, 5 Drawing Sheets

(56) References Cited

U.S. PATENT DOCUMENTS

| | | |
|---|---|---|
| 2006/0066716 A1 | 3/2006 | Chang |
| 2012/0075538 A1 | 3/2012 | Okuda |
| 2013/0342329 A1 | 12/2013 | Hale et al. |
| 2014/0273844 A1 | 9/2014 | Castillo et al. |

* cited by examiner

CONTROL DEVICE FOR CONTROLLING A PLURALITY OF ELECTRONIC DEVICES VIA A PLURALITY OF COMMUNICATION CHANNELS

BACKGROUND

Technical Field

The present invention relates to methods, systems, and apparatuses for controlling a plurality of electronic devices via a plurality of communication channels.

Background Art

The number of remote control devices present in an average household has risen significantly over time. For example, a household may have a separate remote for a television (TV), a digital versatile disc (DVD) player, a Blu-ray player, a video game console, etc. To remedy this problem, remote control devices have been developed that are operable to control multiple different devices. Such remote control devices are referred to as universal remote control devices or universal remotes. However, these remote control devices are bound to a single communications protocol, such as an infrared (IR)-based communications protocol, which requires a line-of-sight to the device to be controlled and suffers from limited range.

BRIEF SUMMARY

Methods, systems, and apparatuses are described for controlling a plurality of electronic devices via a plurality of communication channels, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

Embodiments described herein are directed to controlling a plurality of electronic devices via a plurality of communication channels. For example, a control device may undergo a programming process to enable communication between the control device and a particular electronic device via a first communication channel. After programming is complete, the control device may be configured to transmit one or more commands to the particular electronic device via the first communication channel. The control device may be further configured to perform a pairing sequence with the particular electronic device via the first communication channel to enable control of the particular electronic device via the second communication channel. For example, the control device may transmit command(s) to the particular electronic device via the first communication channel that cause the pairing sequence to be initiated. The control device may determine the proper pairing sequence to be performed subsequent to initiation and monitor whether the user has performed the proper pairing sequence using the control device. Upon detecting that the proper pairing sequence has been performed, the control device may be configured to transmit command(s) to the particular electronic device via the second communication channel.

In particular, a method performed by a control device configured to control a plurality of electronic devices is described herein. In accordance with the method, the control device is programmed to control at least a first one of the plurality of electronic devices via a first communication channel. A pairing sequence is performed, at least in part, between the control device and the first one of the plurality of electronic devices via the first communication channel. The pairing sequence, when completed, enables the control device to control the first one of the plurality of electronic devices via a second communication channel. The first one of the plurality of electronic devices is controlled using the control device via the second communication channel upon completion of the pairing sequence.

A control device configured to control a plurality of electronic devices is also described herein. The control device includes a first transmitter configured to communicate with the plurality of electronic devices via a first communication channel, a second transmitter configured to communicate with the plurality of electronic devices via a second communication channel, and control logic. The control logic is configured to program the control device to control at least a first one of the plurality of electronic devices via first commands transmitted by the first transmitter. The control logic is also configured to perform, at least in part, a pairing sequence between the control device and the first one of the plurality of electronic devices via second commands transmitted by the first transmitter. The pairing sequence, when completed, enables the control device to control the first one of the plurality of electronic devices via third commands transmitted by the second transmitter. The control logic is further configured to control the first one of the plurality of electronic devices using the third commands transmitted by the second transmitter upon completion of the pairing sequence.

A system is also described herein. The system includes one or more processors and a memory. The memory contains computer-readable instructions, which, when executed by the one or more processors, cause the one or more processors to perform operations in a control device configured to control a plurality of electronic devices. In accordance with the operations, the control device is programmed to control at least a first one of the plurality of electronic devices via a first communication channel. A pairing sequence is performed, at least in part, between the control device and the first one of the plurality of electronic devices via the first communication channel. The pairing sequence, when completed, enables the control device to control the first one of the plurality of electronic devices via a second communication channel. The first one of the plurality of electronic devices is controlled using the control device via the second communication channel upon completion of the pairing sequence.

Example Embodiments

Figure 1:
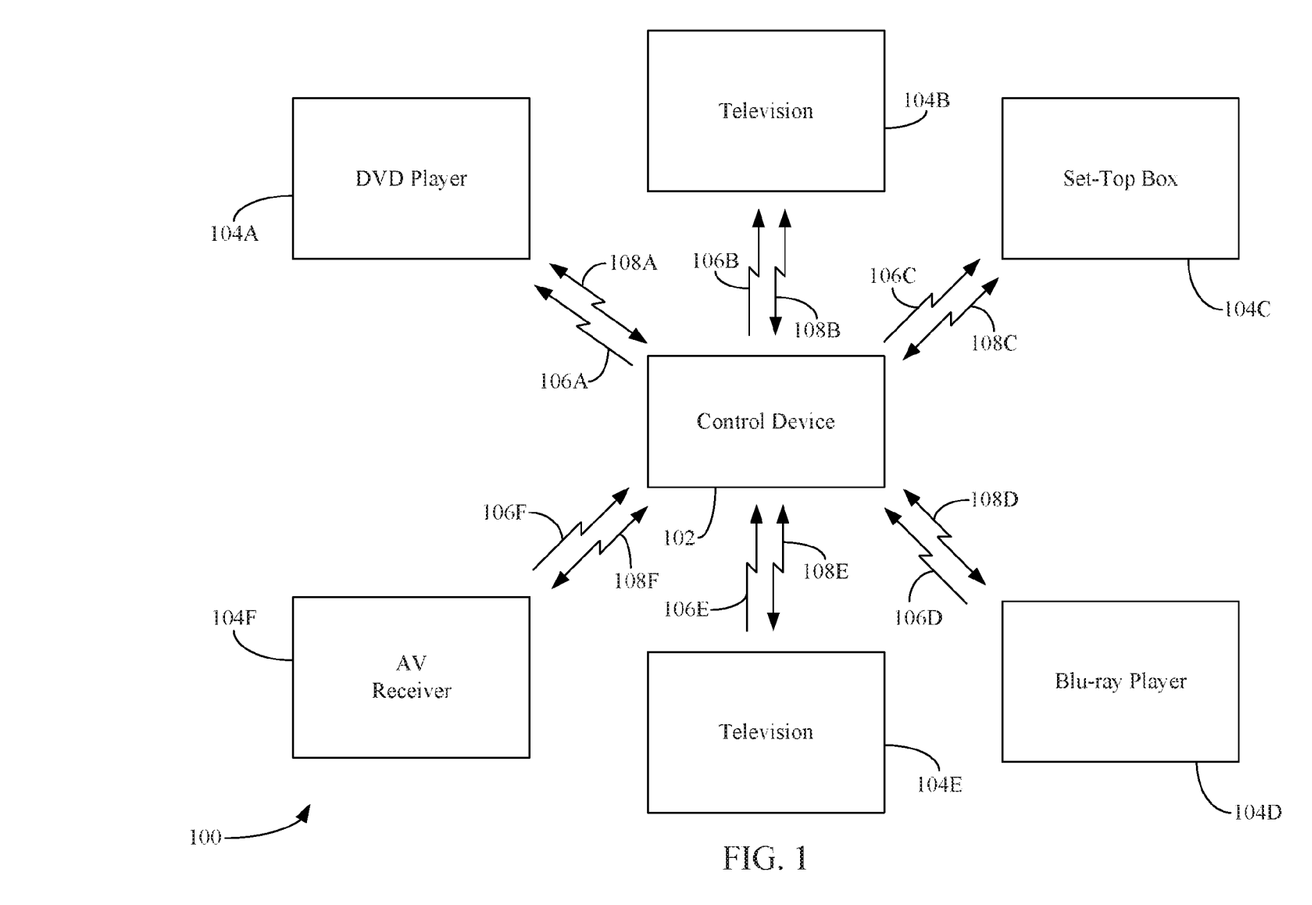
FIG. 1 is a block diagram of a system for controlling a plurality of electronic devices using a control device in accordance with an embodiment.

FIG. 1 is a block diagram of a system 100 for controlling a plurality of electronic devices 104A-104F using a control device 102 in accordance with an embodiment. As shown in FIG. 1, system 100 includes control device 102 and electronic devices 104A-104F. As shown in FIG. 1, electronic device 104A is a digital versatile disc (DVD) player, electronic device 104B is a first television (TV), electronic device 104C is set-top box (e.g., a cable TV set-top box, a satellite TV set-top box, etc.), electronic device 104D is a Blu-ray player, electronic device 104E is a second television, and electronic device 104F is an audio/video (AV) receiver. The depiction of these particular electronics devices is merely for illustrative purposes. Each of electronic devices 104A-104F may be any electronic device that is capable of being controlled by a control device.

Control device 102 is configured to control each of electronic devices 104A-104F. Control device 102 may control each of electronic devices 104A-104F via one or more commands transmitted over one or more communication channels. For example, as shown in FIG. 1, control device 102 may control electronic device 104A via command(s) transmitted over a first communication channel 106A or a second communication channel 108A. Control device 102 may control electronic device 104B via command(s) transmitted over a first communication channel 106B or a second communication channel 108B. Control device 102 may control electronic device 104C via command(s) transmitted over a first communication channel 106C or a second communication channel 108C. Control device 102 may control electronic device 104D via command(s) transmitted over a first communication channel 106D or a second communication channel 108D. Control device 102 may control electronic device 104E via command(s) transmitted over a first communication channel 106E or a second communication channel 108E. Control device 102 may control electronic device 104F via command(s) transmitted over a first communication channel 106F or a second communication channel 108F. As further shown in FIG. 1, first communication channels 106A-106F are unidirectional communication channels, and second communication channels 108A-108F are bidirectional communication channels. First communication channels 106A-106F may be infrared (IR) communication channels, for example. Second communications channels 108A-108F may be radio frequency (RF)-based communication channels. Examples of RF-based communications channels include, but are not limited to, Bluetooth™, as described in the various standards developed and licensed by the Bluetooth™ Special Interest Group, ZigBee® or ZigBee® RF4CE (Radio Frequency for Consumer Electronics), which are based on the IEEE 802.15.4 standard for wireless personal area networks, near field communication (NFC), other RF-based communication technologies such as any of the well-known IEEE 802.11 protocols, etc., and/or the like.

Examples of control device 102 include a remote control device (e.g., a universal remote control device), a laptop, a tablet, a telephone (e.g., a smart phone and/or a mobile phone) and/or the like.

Control device 102 may undergo a programming process to enable communication between control device 102 and a particular electronic device (e.g., one or more of electronic devices 104A-104F) via a first communication channel (e.g., first communication channels 106A-106F). The programming process may comprise receiving input via one or more interface elements of control device 102 that initiates the programming process and receiving input, via the interface element(s), corresponding to a control code associated with the particular electronic device. After programming is complete, control device 102 may be configured to transmit command(s) to the particular electronic device via the first communication channel.

Control device 102 may be further configured to perform a pairing sequence with the particular electronic device to enable control device 102 to control the particular electronic device via the second communication channel. For example, control device 102 may transmit command(s) to the particular electronic device (via the first communication channel) that cause the pairing sequence to be initiated. Control device 102 may determine the proper pairing sequence to be performed subsequent to initiation. The pairing sequence may comprise activation of a sequential combination of a particular one or more interface elements of control device 102. Control device 102 may be configured to monitor the interface elements that are interacted with by the user to determine if the proper pairing sequence has been performed by the user. Upon detecting that the proper pairing sequence has been performed, control device 102 may be configured to transmit command(s) to the particular electronic device via the second communication channel.

Figure 2:
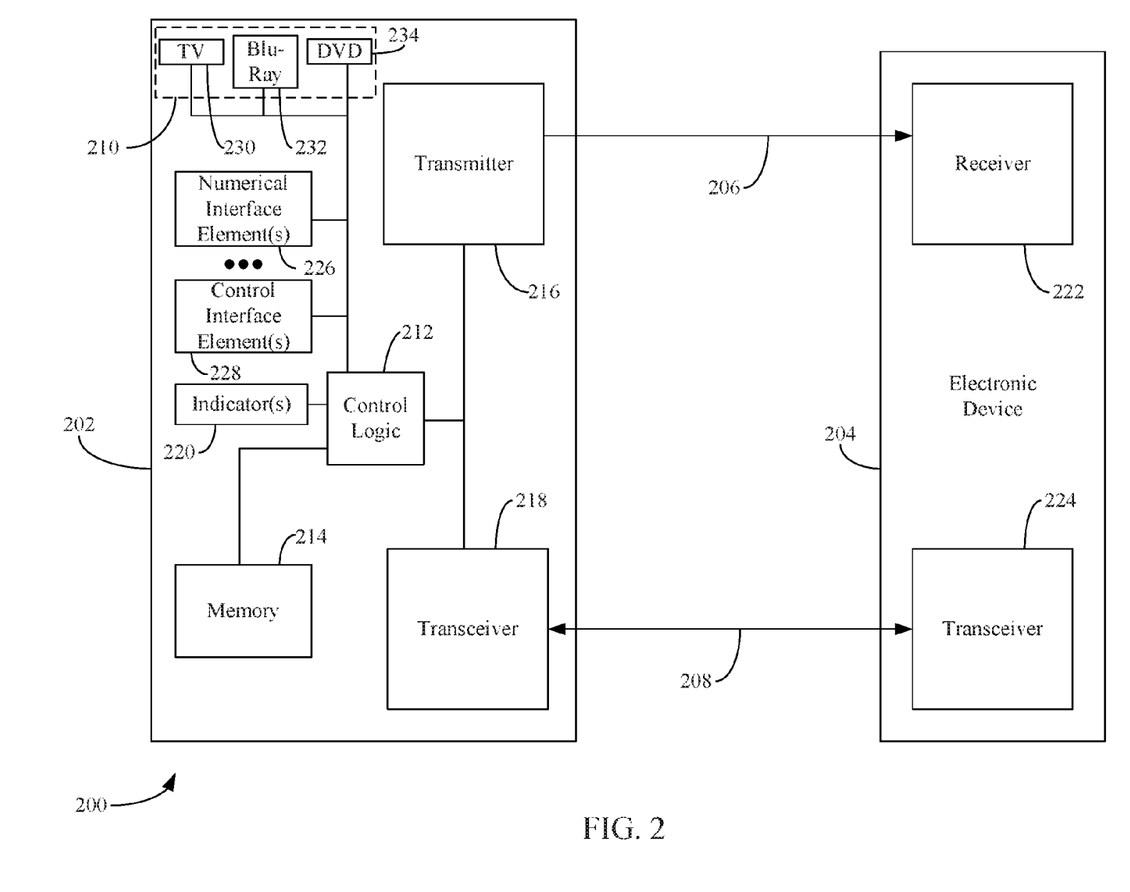
FIG. 2 is a block diagram of a system for controlling an electronic device using a control device in accordance with an embodiment.

FIG. 2 is a block diagram of a system 200 for controlling an electronic device 204 using a control device 202 in accordance with an embodiment. Control device 202 is an example of control device 102, as described above in reference to FIG. 1. Electronic device 204 is an example of any of electronic device(s) 104A-104F, as described above in reference to FIG. 1.

As shown in FIG. 2, control device 202 includes control logic 212, one or more device type interface elements 210, one or more numerical interface elements 226, one or more control interface elements 228, one or more indicators 220, a memory 214, a transmitter 216, and a transceiver 218. As further shown in FIG. 2, electronic device 204 includes a receiver 222 and a transceiver 224.

Control device 202 may be configured to control electronic device 204 via a first communication channel 206 (e.g., an IR-based communication channel) by transmitting command(s) to electronic device 204 via transmitter 216. First communication channel 206 is an example of any of first communication channel(s) 106A-106F, as described above with reference to FIG. 1. Receiver 222 of electronic device 204 may be configured to receive the command(s) via first communication channel 206. In accordance with an embodiment in which first communication channel 206 is an IR-based communication channel, transmitter 216 is an IR transmitter (e.g., an IR LED) and receiver 222 is an IR receiver (e.g., an IR sensor).

Control device 202 may be configured to control electronic device 204 via a second communication channel 208 (e.g., an RF-based communication channel) by transmitting command(s) to electronic device 204 via transceiver 218. Second communication channel 208 is an example of any of second communication channel(s) 208A-208F, as described above in reference to FIG. 1. Transceiver 224 of electronic device 204 may be configured to receive the command(s) via second communication channel 208. In accordance with an embodiment in which second communication channel 208 is an RF-based communication channel, transceiver 218 and transceiver 224 are RF transceivers.

In accordance with an embodiment, control device 202 and/or electronic device 204 use a separate transmitter and receiver (rather than transceiver 218 and transceiver 224, respectively) for transmitting and/or receiving command(s) via second communication channel 208.

Control interface element(s) 228, when activated, may initiate a programming process that enables control device 202 to control electronic device 204 via first communication channel 206 and/or may initiate a pairing process that enables control device 202 to control electronic device 204 via second communication channel 208. Device type interface element(s) 210, when activated, designate the electronic device (e.g., electronic device 204) to be controlled by control device 202 and/or designates the type of electronic device that is being programmed for and/or paired with control device 202.

As shown in FIG. 2, examples of device type interface element(s) 210 include, but are not limited to, a "TV" interface element 230, a "DVD" interface element 234, and "a Blu-ray" interface element 232. It is noted however that control device 202 may include additional device type interface elements for other types of electronic devices that are not shown for brevity. "TV" interface element 230, when activated, may enable control device 202 to control a TV (e.g., TV 104B or TV 104E, as shown in FIG. 1) for which control device 202 is programmed and/or paired with. "DVD" interface element 234, when activated, may enable control device 202 to control a DVD player (e.g., DVD player 104A, as shown in FIG. 1) for which control device 202 is programmed and/or paired with. "Blu-ray" interface element 232, when activated, may enable control device 202 to control a Blu-ray player (e.g., Blu-ray player 104D) for which control device 202 is programmed and/or paired with.

Numerical interface element(s) 226 may represent a user interface, such as a number pad, touch screen, or the like that enables a user to enter a channel that the user would like to watch via electronic device 204, enter a control (or "programming") code to program and/or pair control device 202 with electronic device 204, etc. It is noted that each of control interface element(s) 228, device type interface element(s) 210, and/or numerical interface element(s) 226 may be physical interface elements (e.g., buttons, sliders, jog shuttles, etc.) or virtual interface elements (e.g., icons, buttons, etc.) displayed via a capacitive touch display screen. It is further noted that control device 202 may include other interface elements configured to perform other functionality (e.g., volume control, menu activation, etc.) that are not shown for brevity.

To enable control device 202 to control electronic device 204 via first communication channel 206, control device 202 may undergo a programming process. To initiate the programming process, a user may interact with (e.g., activate) one or more of control interface element(s) 228 (e.g., a "setup" or "program" interface element) and/or a device type interface element that designates the type of electronic device for which control is desired. For example, if electronic device 204 is a TV, a user may interact with (e.g., "press and release" or "press and hold" particular control interface element(s) 228, and subsequently interact with (e.g., "press and release") "TV" interface element 230. Control logic 212 may be configured to determine that the programming process has been initiated by determining that particular control interface element(s) 210 and/or "TV" interface element 230 have been interacted with in proper order and fashion. Upon determining that the programming process has been initiated, control logic 212 may cause indicator(s) 220 to be activated to confirm to the user that the programming process has been initiated. Examples of indicator(s) 220 include a light-emitting diode (LED), an auditory tone played back via speaker (not shown) included in control device 202, an icon or message displayed via a display screen (not shown) included in control device 202, and/or the like.

After the programming process has been initiated, a user may enter in a predetermined control code (e.g., a sequence of numbers or alphanumeric characters, such as may be found in an instruction manual associated with control device 202) corresponding to the electronic device (e.g., electronic device 204) for which control device 202 is being programmed using numerical interface element(s) 226. Control logic 212 may be configured to determine that a control code been entered. Upon determining that a control code has been entered, control logic 212 may associate the control code with the device type interface element activated during the programming process and cause command(s) (e.g., a coded signal) based on the associated control code to be transmitted via the first communication channel. For example, when transmitting command(s) to electronic device 204, control logic 212 may format the command(s) to include an identifier (e.g., a device address) corresponding to the associated control code. The identifier may be a device address associated with electronic device 204. The identifier enables electronic device 204 to determine that command(s)

transmitted by control device 202 including the identifier are intended for electronic device 204. In accordance with an embodiment, the control code is the indicator. Control logic 212 may provide the formatted command(s) to transmitter 216, which transmits the formatted command(s) to electronic device 204 via first communication channel 206.

A user may repeat this process to program other electronic devices. For example, to program a DVD player, a user may interact act with particular control interface button(s) 228, interact with "DVD interface element" 234, and/or enter in a predetermined control code for the DVD player being programmed.

Thus, when a user desires to control the DVD player, a user may interact with (e.g., "press and release") "DVD" interface element 234, which causes control logic 212 to format commands transmitted by control device 202 to include the identifier corresponding to the DVD player. When a user desires to control the TV, a user may interact with "TV" interface element 230, and control logic 212 may switch from formatting commands to include the identifier corresponding to the DVD player to formatting commands to include the identifier corresponding to the TV.

It is noted that the programming techniques described above are purely exemplary and that other programming techniques may be used to program control device 202 to control electronic device(s) via first communication channel 206.

Memory 214 may be configured to store a plurality of identifiers for a variety of different electronic devices (TVs, Blu-ray players, DVD players, AV receivers, etc.). Each of the identifiers may be device-specific, model number-specific, and/or manufacturer-specific. Examples of manufacturers include, but are not limited to, Sony®, Toshiba®, Panasonic®, LG®, Samsung®, Vizio®, etc. Memory 214 may be pre-loaded with the identifiers at the time of manufacture, or may download the identifiers at a subsequent time. In accordance with an embodiment, control device 202 may be updated (e.g., via a software and/or firmware upgrade) to be operable with additional control codes and/or memory 214 may updated to include additional identifiers for other electronic device(s). The identifier to be used when transmitting command(s) via first communication channel 206 may be retrieved from memory 214 using the control code associated with the device type interface element (e.g., "TV" interface element 230, "DVD" interface element 234, or "Blu-ray" interface element 232) most recently activated. For example, in response to determining that "TV" interface element 230 has been activated, control logic 212 may retrieve an identifier from memory 214 using the control code associated with "TV" interface element 230. Similarly, in response to detecting that DVD interface element 234 has been interacted with, control logic 212 may retrieve an indicator from memory 214 using the control code associated with "DVD" interface element 234.

After the programming process is complete, control device 202 may be configured to control electronic device 204 to perform various operations via first communication channel 206. Examples of operations include, but are not limited to, controlling the volume, changing the channel, powering on or off electronic device 204, controlling playback options of media content being provided by electronic device 204, activating and/or navigating a menu associated with electronic device 204, etc.

Another operation may be initiating and/or performing a pairing sequence between control device 202 and electronic device 204 that, when completed, enables control device 202 to control electronic device 204 via second communication channel 208. Each electronic device may have its own pairing sequence. For example, electronic device 204 may require a different pairing sequence than another electronic device.

Memory 214 may be further configured to store a plurality of pairing sequences. Each of the pairing sequences may be associated with a particular identifier stored in memory 204. Thus, the pairing sequences stored in memory 214 may be for a variety of different electronic devices and/or may be device-specific, model number-specific, and/or manufacturer-specific. Memory 214 may be pre-loaded with the plurality of pairing sequences at the time of manufacture. In accordance with an embodiment, control device 202 may be updated (e.g., via a software and/or firmware upgrade) to include additional pairing sequences. Each of the pairing sequences may comprise one or more steps that are to be performed in order to successfully pair control device 202 with a particular electronic device. Each of the pairing sequences may further comprise one or more operations to be carried out by control logic 212 in the event certain steps of the pairing sequence are performed successfully (e.g., activating certain indicator(s) 220, transmitting of command(s) to the electronic device 204, configuring transceiver 218 to operate at a frequency used to transmit and/or receive commands from electronic device 204 via second communication channel 208).

Control device 202 may be configured to determine which pairing sequence is to be performed based on the identifier associated with the device type interface element most recently activated. For example, in response to determining that "TV" interface element 230 has been activated, control logic 212 may be configured to select the pairing sequence from the plurality of pairing sequences stored in memory 214 using the identifier associated with "TV" interface element 230. Similarly, in response to detecting that "DVD" interface element 234 has been activated, control logic 212 may be configured to select the pairing sequence from the plurality of pairing sequences stored in memory 214 using the identifier associated with "DVD" interface element 234.

Pairing sequences may involve interaction with particular interface element(s) (e.g., device type interface element(s) 210, numerical interface element(s) 226 and/or control interface element(s) 228) and/or activation of indicator(s) 220. Control logic 212 may be configured to monitor the particular interface element(s) to determine whether the particular interface element(s) have been interacted with in accordance with the selected pairing sequence and activate indicator(s) 220 as required by the selected pairing sequence. For example, control logic 212 compares the steps performed by the user via the particular interface element(s) to the steps included in the selected pairing sequence to determine whether the proper pairing sequence has been performed.

For example, the pairing sequence may comprise a first step requiring that one or more particular control interface elements 228 are to be pressed and/or held for a predetermined period of time (either sequentially or simultaneously), which causes indicator(s) 220 to be activated on control device 202 to indicate successful completion of this step. Because control logic 212 has selected the proper pairing sequence to be performed, control logic 212 may monitor the interaction with particular control interface element(s) 228 to determine whether particular control interface element(s) 228 are pressed and/or held in accordance with the selected pairing sequence. In response to determining that the proper control interface element(s) are being interacted with in accordance with the selected pairing sequence, control logic 212 may cause indicator(s) 220 to be activated, thereby indicating confirmation that this step of the pairing sequence has been completed successfully. The pairing sequence may comprise one or more next step(s) requiring interaction of one or more other interface element(s). For instance, the user may be required to enter in a control code (e.g., a PIN (personal identification number)) using numerical interface element(s) 226. Control logic 212 may monitor whether the user has entered the proper control code by monitoring the interaction with numerical interface element(s) 226. Upon determining that the user has successfully performed the pairing sequence, control logic 212 may cause indicator(s) 220 to be activated, thereby indicating that these step(s) of the pairing sequence have been completed.

It is noted that the pairing sequences described above are purely exemplary and that other pairing sequences may be used to pair control device 202 with electronic device(s) to enable communication via second communication channel 208.

In accordance with an embodiment, the pairing sequence may be initiated by activating a menu option of electronic device 204. For example, upon a user selecting the device type interface element corresponding to electronic device 204 (thereby enabling the user to control electronic device via first communication channel 206), a user may interact with particular control interface element(s) 228 on control device 202 that cause a graphical user interface (e.g., a menu) to be displayed on a display screen included in electronic device 204 or on a display screen coupled to electronic device 204. Using control device 202, a user may navigate the menu and find a menu option that, when selected, initiates the pairing sequence. In response to selecting the menu option, the display screen may display steps to be performed by the user using control device 202 to complete the pairing sequence. As described above, the steps may comprise requiring that a particular one or more interface elements of control device 202 are to be pressed and/or held for a predetermined period of time and/or requiring entry of a control code using numerical interface element(s) 226. In accordance with such an embodiment, the control code to be entered may be displayed on the display screen in response to activation of the menu option.

In accordance with another embodiment, the pairing sequence may be initiated upon activation of particular control interface element(s) 228 of control device 202 (e.g., a "Pair" interface element). For example, in response to determining that the particular control interface element(s) 228 have been activated, control device 202 may transmit command(s) that cause electronic device 204 to display steps for performing the pairing sequence via a graphical user interface.

After completing the steps, control device 202 may transmit a command to electronic device 204 via first communication channel 206 that includes pairing information, e.g., an identification code that uniquely identifies control device 202. In response, electronic device 204 may configure itself to receive and accept subsequent commands from control device 202 via second communication channel 208. It is noted it is not necessary for control device 202 to transmit such command(s) after completing the steps of the pairing sequence. Instead, such command(s) may be transmitted to electronic device 204 as part of or after any of the steps required by the pairing sequence.

After configuration is complete, transceiver 224 of electronic device 204 may transmit a response to electronic control device 202 via second communication channel 208 that indicates that pairing between control device 202 and electronic device 204 was successful. Upon transceiver 218 of control device 202 receiving and acknowledging the response from electronic device 204, the pairing sequence may be complete and control device 202 may be configured to transmit command(s) configured to control electronic device 204 to electronic device 204 via second communication channel 208 (e.g., commands to select a channel, change channels, select particular media for playing, fast forward, rewind, enter content search queries, etc.). For example, control logic 212 may provide command(s) to transceiver 218, which transmits command(s) to electronic device 204 via second communication channel 208. In accordance with an embodiment, after control device 202 is paired with electronic device 204, control device 202 only sends command(s) to electronic device 204 via second communication channel 208 and no longer transmits command(s) to electronic device 204 via first communication channel 206. In accordance with such an embodiment, control device 202 may revert to sending commands via first communication channel 206 in the event that control device 202 is de-paired from electronic device 204. For example, control logic 212 may be configured to detect that control device 202 has been de-paired from electronic device 204 and cause command(s) to be transmitted via first communication channel 206. In accordance with another embodiment, control device 202 continues to send commands via both first communication channel 206 and second communication channel 208 after control device 202 has been paired with electronic device 204.

A user may perform pairing sequences to pair any number of electronic devices with control device 202. After the pairing sequence is complete for a particular electronic device, a user may control the particular electronic device via second communication channel 208 by activating the device type interface element associated with that electronic device. In an embodiment in which second communication channel 208 is an RF-based communication channel, each electronic device may be configured to communicate (i.e., transmit and receive commands) using a different frequency. In accordance with an embodiment, transceiver 218 may comprise a tunable antenna. In accordance with such an embodiment, the antenna may be tuned such that it operates at the frequency used by the transceiver (e.g., transceiver 224) of the electronic device associated with the most recently activated device type interface element. For example, assuming that both a DVD player and a TV have been paired with control device 202, upon activating "DVD" interface element 234, control logic 212 may send a signal to transceiver 218 that causes the tunable antenna to transmit and/or receive command(s) using the frequency of the transceiver of the DVD player. Upon activating "TV" interface element 230, control logic 212 may send a signal to transceiver 218 that causes the antenna to switch from transmitting and/or receiving command(s) using the frequency of the transceiver of the DVD player to transmitting and/or receiving command(s) using the frequency of the transceiver of the TV.

Figure 3:
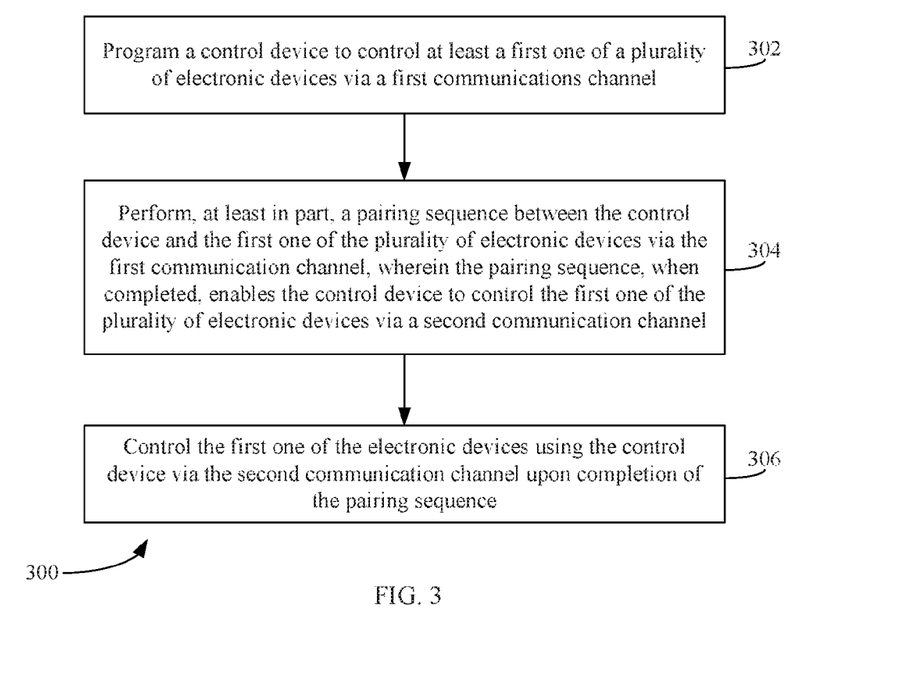
FIG. 3 shows a flowchart of a method for configuring a control device to control an electronic device in accordance with an embodiment.
Figure 4:
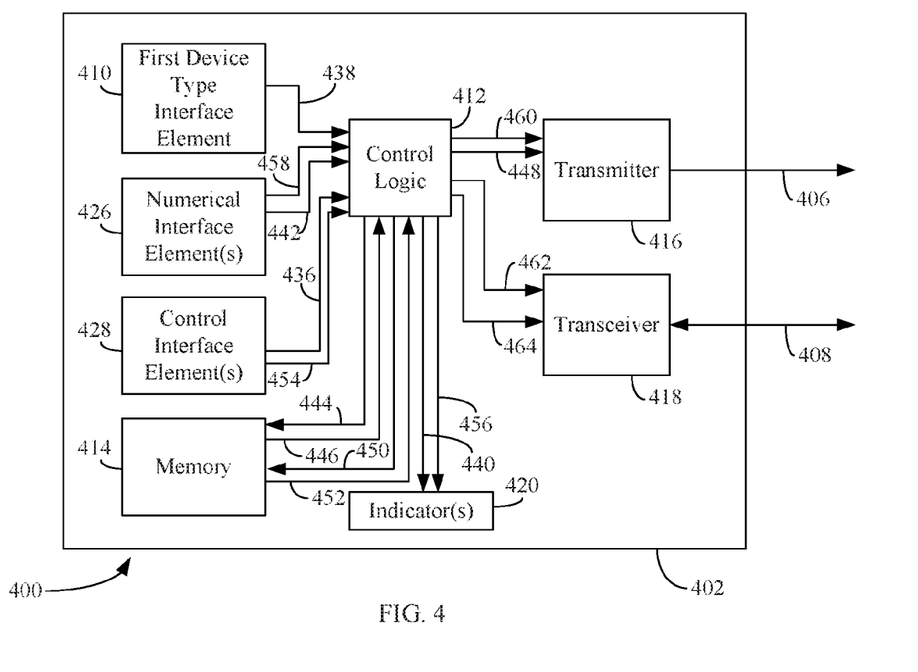
FIG. 4 is a block diagram of a control device in accordance with an embodiment.

Accordingly, in embodiments, a control device may be configured to control an electronic device in many ways. For instance, FIG. 3 shows a flowchart 300 of a method for configuring a control device to control an electronic device in accordance with an embodiment. The method of flowchart 300 may be implemented by a control device 402 shown in FIG. 4. FIG. 4 depicts a block diagram 400 of control device 402 in accordance with an embodiment. Control device 402 is an example of control device 202, as described above in reference to FIG. 2. As shown in FIG. 4, control device 402 includes a first device type interface element 410, a numerical interface element(s) 426, a control interface element(s) 428, a memory 414, control logic 412, one or more indicators 420, a transmitter 416, and a transceiver 418. First device type interface element(s) 410 are an example of device type interface element(s) 210 (e.g., first device type interface element 410 is an example of any of "TV" interface element 230, "Blu-ray" interface element 232, or "DVD" interface element 234), numerical interface element(s) 426 is an example of numerical interface element(s) 226, control interface element(s) 428 is an example of control interface element(s) 228, memory 414 is an example of memory 214, control logic 412 is an example of control logic 212, indicator(s) 420 is an example of indicator(s) 220, transmitter 416 is an example of transmitter 216, and transceiver 418 is an example of transceiver 218, as described above in reference to FIG. 2. Other structural and operational embodiments will be apparent to persons skilled in the relevant art(s) based on the following discussion regarding flowchart 300 and control device 402.

Flowchart 300 begins with step 302. At step 302, a control device is programmed to control at least a first one of a plurality of electronic devices via a first communication channel. For example, with reference to FIG. 4, control device 402 is programmed to control at least a first one of a plurality of electronic devices. To initiate the programming of control device 402, a user may interact with (e.g., activate) control interface element(s) 428 (e.g., a "setup" interface element or a "program" interface element). In response to activating control interface element(s) 428, control interface element(s) 428 may provide signal(s) 436 to control logic 412. A user may, in conjunction or subsequent to activating control interface element(s) 428, may activate a device type interface element (e.g., first device type interface element 410) corresponding to the electronic device for which control device 402 is being programmed. In response to activating first device type interface element 410, first device type interface element 410 provides a signal 438 to control logic 412. Upon receiving signal 436 and signal 438, control logic 412 determines that the programming process has been initiated and may provide a signal 440 that causes indicator(s) 420 to be activated. To complete the programming process, the user may enter in a control code associated with the electronic device for which control device 402 is being programmed. To enter in the control code, the user may activate particular numerical interface element(s) 426 corresponding to the control code. In response to activating such numerical interface element(s) 426, such numerical interface element(s) 426 provide signal(s) 442 corresponding to the control code to control logic 412. Upon receiving signal(s) 442, control logic 412 may determine the control code entered in by the user and may send a request 444 (e.g., a read request) including the control code to memory 414. In response, memory 414 retrieves an indicator 446 (e.g., a device address) based on the control code and provides indicator 446 to control logic 412. Thereafter, upon detecting an input of command(s) configured to control the electronic device (e.g., controlling the volume, changing the channel, powering on or off the electronic device, controlling play back options of media content being provided by the electronic device, activating and/or navigating a menu associated with the electronic device, etc.), control logic 412 may format the command(s) to include the indicator and provide the formatted command(s) (e.g., formatted command(s) 448) to transmitter 416, which transmits formatted command(s) 448 via first communication channel 406.

At step 304, a pairing sequence is performed, at least in part, between the control device and the first one of the plurality of electronic devices via the first communication channel. The pairing sequence, when completed, enables the control device to control the first one of the plurality of electronic devices via a second communication channel. For example, with reference to FIG. 4, the pairing sequence is performed, at least in part, by control device 402 and another electronic device via first communication channel 406.

Control device 402 may be configured to ensure that the proper pairing sequence is being performed with respect to the electronic device to which control device 402 is to be paired. For example, control device 402 may determine an identifier corresponding to the first one of the plurality of electronic devices based on the programming performed in step 302 and select the pairing sequence to be performed by at least control device 402 from a plurality of pairing sequences based on the identifier. For instance, the identifier may be determined based on response 446 received from memory 414, which indicates the identifier for the electronic device. Once the identifier is determined, control logic 412 may provide a request 450 including the identifier to memory 414. In response, memory 414 selects a pairing sequence 452 from a plurality of pairing sequences stored in memory 414 based on the identifier and provides selected pairing sequence 452 to control logic 412. Control logic 412 may compare the steps performed by the user to selected pairing sequence 452 to determine whether the user has successfully performed the pairing sequence. Selected pairing sequence 452 may further comprise one or more operations to be carried out by control logic 412 in the event certain steps of the pairing sequence are performed successfully (e.g., activating certain indicator(s) 420, transmitting command(s) to the electronic device, etc.).

In accordance with an embodiment, the pairing sequence may comprise a first step requiring that a particular one or more interface elements of control device 402 are to be activated for a predetermined period of time (either sequentially or concurrently). For example, the first step may require certain control interface element(s) 428 to be interacted with (e.g., pressed down) for a predetermined period of time. In response to control interface element(s) 428 being interacted with for a predetermined period of time, control interface element(s) 428 may provide signal(s) 454 to control logic 412. Upon receiving signal(s) 454, control logic 412, may compare signal(s) 454 to selected pairing sequence 452 to determine whether the proper control interface elements have been interacted with by the user. In response to determining that the proper control interface elements have been interacted with, control logic 412 may determine that the first step has been completed. Control signal 412 may also provide a signal 456 that causes indicator(s) 420 to be activated if such functionality is mandated by selected pairing sequence 452.

The pairing sequence may further comprise one or more next step(s) requiring interaction of one or more other interface element(s). For instance, the user may be required to enter in a control code (e.g., a PIN) using numerical interface element(s) 426. To enter in the control code, the user may activate numerical interface element(s) 426 corresponding to the control code. In response to activating such numerical interface element(s) 426, such numerical interface element(s) 426 provide signal(s) 458 corresponding to the control logic to control logic 412. Upon receiving signal(s) 458, control logic 412 may compare signal(s) 458 to selected pairing sequence 452 to determine whether the proper control code has been entered. In response to determining that the proper control code has been entered, control logic 412 may determine that the next step(s) have been completed and provide a command 460 to the electronic device via first communication channel 406 that includes pairing information, e.g., an identification code that uniquely identifies control device 402. In response, the electronic device may configure itself to receive and accept subsequent commands from control device 402 via second communication channel 408. After configuration is complete, the electronic device may transmit a response to control device 402 via second communication channel 408 that indicates that pairing between control device 402 and the electronic device was successful. After receiving the response from the electronic device, the pairing sequence may be complete, and control device 402 is enabled to transmit command(s) to the electronic device via second communication channel 408.

In accordance with an embodiment, to enable control device 402 to receive the response from the electronic device and subsequently transmit command(s) to the electronic device, control device 402 may be configured to provide a signal 464 to transceiver 418 that causes transceiver 418 to transmit and/or receive commands using the frequency in which the electronic device transmits and/or receives commands via second communication channel 408.

At step 306, the first one of the plurality of electronic devices is controlled using the control device via the second communication channel upon completion of the pairing sequence. For example, with reference to FIG. 4, control logic 412 may cause command(s) 462 configured to control the electronic device (e.g., controlling the volume, changing the channel, powering on or off the electronic device, controlling play back options of media content being provided by the electronic device, activating and/or navigating a menu associated with the electronic device, etc.) to be transmitted to the electronic device via second communication channel 408.

In accordance with one or more embodiments, the first communication channel is an IR-based communication channel, and the second communication channel is an RF-based communication channel. In accordance with an embodiment, the RF-based communication channel is an RF4CE communication channel.

In accordance with one or more embodiments, the performing of the pairing sequence as described above with reference to step 304 may be initiated upon selection, using the control device, of a menu option via a graphical user interface of the electronic device. The menu option, when selected, may be configured to initiate the pairing sequence. For example, the menu option may display steps to be performed by the user using control device 402 to perform the pairing sequence.

In accordance with one or more embodiments, the performing of the pairing sequence as described above with reference to step 304 may be initiated upon detecting activation of one or more interface elements of the control device. For example, with reference to FIG. 4, the pairing sequence may be initiated upon activation of a particular control interface element of control interface element(s) 428 (e.g., a "Pair" interface element). For instance, in response to determining that the particular control interface element(s) have been activated, control logic 412 may transmit a command that causes the electronic device to display steps for performing the pairing sequence via a graphical user interface.

In accordance with one or more embodiments, the control device is a remote control device.

In some example embodiments, one or more of steps 302, 304, and/or 306 of flowchart 300 may not be performed. Moreover, operations in addition to or in lieu of steps 302, 304, and/or 306 may be performed. Further, in some example embodiments, one or more of steps 302, 304, and/or 306 may be performed out of order, in an alternate sequence, or partially (or completely) concurrently with each other or with other operations.

Figure 5:
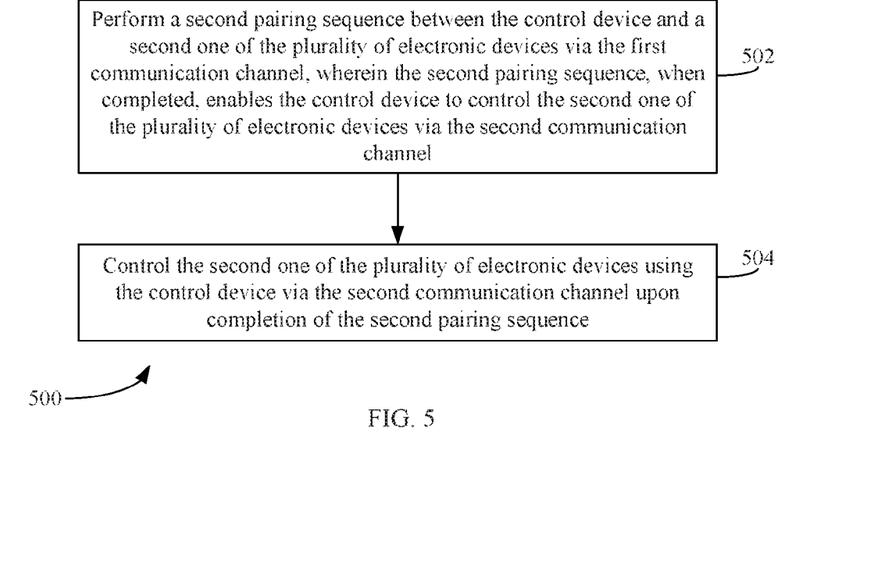
FIG. 5 shows a flowchart of a method for configuring a control device to control another electronic device in accordance with an embodiment.
Figure 6:
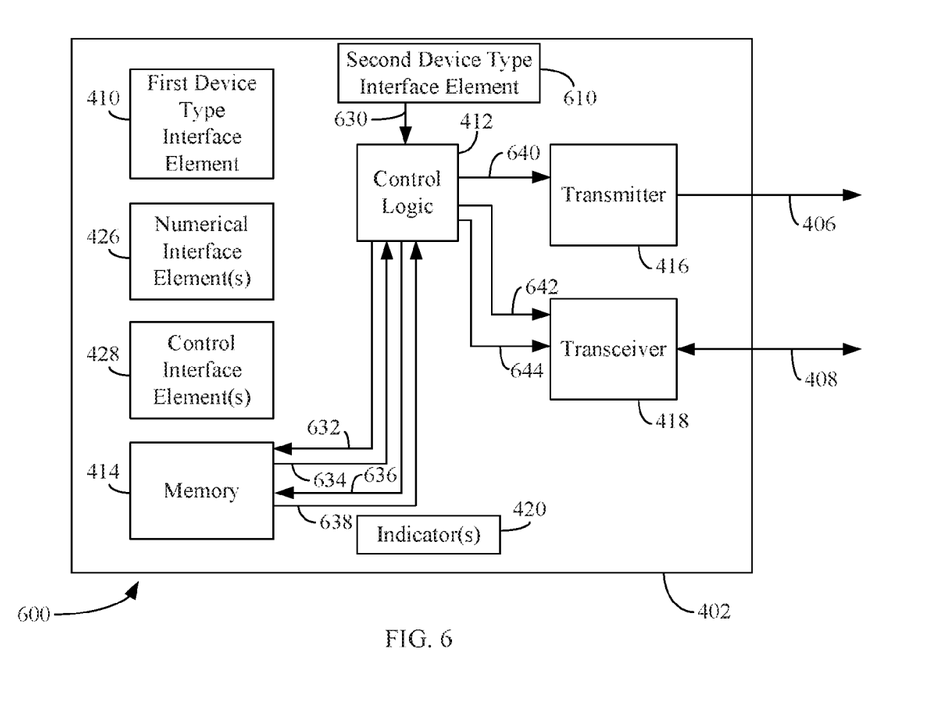
FIG. 6 is a block diagram of a control device in accordance with another embodiment.

In accordance with an embodiment, control device 402 may be configured to control another electronic device via second communication channel 408. For instance, FIG. 5 shows a flowchart 500 of a method for configuring control device 402 to control another electronic device via second communication channel 408 in accordance with an embodiment. The method of flowchart 500 may be implemented by control device 402 shown in FIG. 6. FIG. 6 depicts a block diagram 600 of control device 402 (as shown in FIG. 4) that further includes a second device type interface element 610 in accordance with an embodiment. Second device type interface element 610 is example of device type interface element(s) 210 (as shown in FIG. 2) that is different from first device type interface element 410. For example, first device type interface element 410 may be "TV" interface element 230 and second device type interface element 610 may be "DVD" interface element 234. Other structural and operational embodiments will be apparent to persons skilled in the relevant art(s) based on the following discussion regarding flowchart 500 and control device 602.

The steps of FIG. 5 are premised on the assumption that control device 402 is already programmed to control another electronic device via a first communication channel (e.g., using a programming process as described above with reference to step 302 of FIG. 3), but has not yet been paired with the other electronic device for communication via the second communication channel.

Flowchart 500 begins with step 502. At step 502, a second pairing sequence is performed, at least in part, between the control device and a second one of the plurality of electronic devices via the first communication channel. The second pairing sequence, when completed, enables the control device to control the second one of the plurality of electronic devices via the second communication channel. For example, with reference to FIG. 4, the pairing sequence is performed, at least in part, by control device 402 and an electronic device via first communication channel 406.

To enable communication between control device 402 and the other electronic device via first communication channel 406, a user may activate second device type interface element 610 which, upon activation, enables control device 402 to transmit command(s) to the other electronic device via first communication channel 406. For example, in response to activating second device type interface element 610, second device type interface element 610 provides a signal 630 to control logic 412. Signal 630 may cause control logic 412 to send a request 632 (e.g., a read request), which includes a control code that was associated with second device type interface element 630 during programming, to memory 414. In response, memory 414 retrieves an identifier 634 (e.g., a device address) based on the control code and provides identifier 634 to control logic 412. Thereafter, upon detecting an input of command(s) configured to control the other electronic device, control logic 412 may format the command(s) to include the identifier and provide formatted command(s) to transmitter 416, thereby enabling control device 402 to perform the pairing sequence via first communication channel 406.

To ensure that the proper pairing sequence is being performed with respect to the other electronic device to which control device 402 is to be paired, control logic 412 may provide a request 636 including identifier 634 to memory 414. In response, memory 414 selects a pairing sequence 638 from a plurality of pairing sequences stored in memory 414 based on identifier 634 and provides selected pairing sequence 638 to control logic 412. Control logic 412 may compare the steps performed by the user (using control device 406) to selected pairing sequence 638 to determine whether the user has successfully performed the pairing sequence. Selected pairing sequence 638 may further comprise one or more operations to be carried out by control logic 412 in the event certain steps of the pairing sequence are performed successfully (e.g., activating certain indicator(s) 420, transmitting command(s) to the electronic device, etc.), as described above with reference to step 304 of FIG. 3. Selected pairing sequence 638 may comprise different instruction(s) than selected pairing sequence 452, as described above in reference to FIGS. 3 and 4.

Upon determining that the steps for selected pairing sequence 638 have been properly performed, control logic 412 may provide a command 640 to the other electronic device via first communication channel 406 that includes pairing information, e.g., an identification code that uniquely identifies control device 402. In response, the other electronic device may configure itself to receive and accept subsequent command(s) from control device 402 via second communication channel 408. After configuration is complete, the other electronic device may transmit a response to control device 402 via second communication channel 408 that indicates that pairing between control device 402 and the electronic device was successful. After receiving the response from the other electronic device, the pairing sequence may be complete and control device 402 may be configured to transmit command(s) to the electronic device via second communication channel 408.

In accordance with an embodiment, to enable a control device to receive the response from the other electronic device and subsequently transmit command(s) to the other electronic device, the control device may be configured to switch from a first frequency at which the control device communicates with the first one of the plurality of electronic devices via the second communication channel to a second frequency at which the control device communicates with the second one of the plurality of electronic devices via the second communication channel. For example, with reference to FIG. 4, control logic 412 may be configured to provide a signal 642 to transceiver 418 that causes transceiver 418 to switch from a first frequency at which control device 402 communicates via second communication channel 408 to a second frequency at which the control device communicates with the other electronic device via second communication channel 408.

At step 504, the second one of the plurality of electronic devices is controlled using the control device via the second communication channel upon completion of the pairing sequence. For example, with reference to FIG. 6, control logic 412 may cause command(s) (e.g., command(s) 644) configured to control the other electronic device to be transmitted to the other electronic device via second communication channel 408.

In some example embodiments, one or more of steps 502 and/or 504 of flowchart 500 may not be performed. Moreover, operations in addition to or in lieu of steps 502 and/or 504 may be performed. Further, in some example embodiments, one or more of steps 502 and/or 504 may be performed out of order, in an alternate sequence, or partially (or completely) concurrently with each other or with other operations.

Further Example Embodiments

A device, as defined herein, is a machine or manufacture as defined by 35 U.S.C. §101. That is, as used herein, the term "device" refers to a machine or other tangible, manufactured object and excludes software and signals. Devices may include digital circuits, analog circuits, or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, infrared and other wireless media. Example embodiments are also directed to such communication media.

The automatic detection of the power status of electronic device(s) and/or the automatic control scheme of electronic device(s) embodiments and/or any further systems, subsystems, and/or components disclosed herein may be implemented in hardware (e.g., hardware logic/electrical circuitry), or any combination of hardware with software (computer program code configured to be executed in one or more processors or processing devices) and/or firmware.

Figure 7:
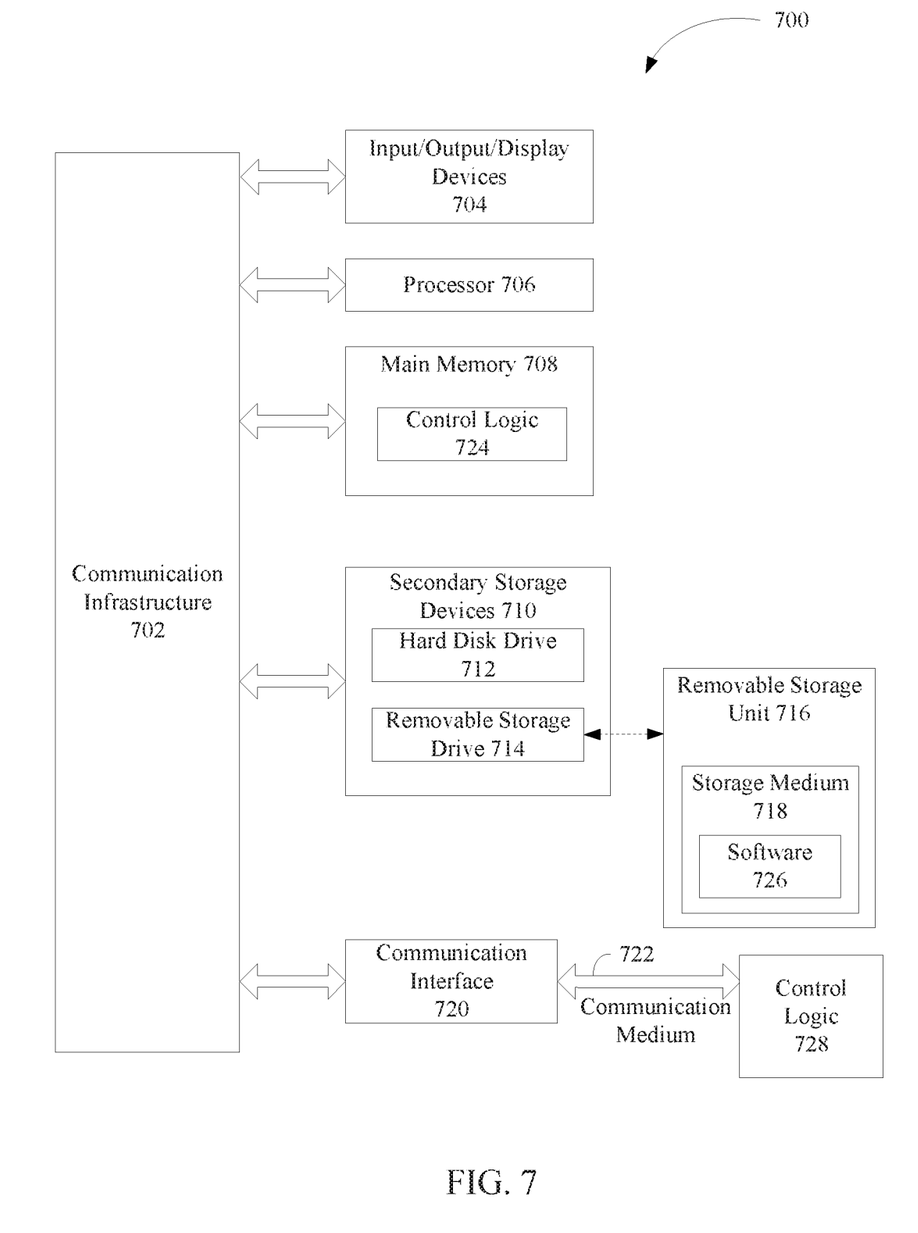
FIG. 7 is a block diagram of a computer system in accordance with an embodiment.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 700 shown in FIG. 7. It should be noted that computer 700 may represent communication devices, processing devices, servers, and/or traditional computers in one or more embodiments. For example, control device 102, control device 202, and/or control device 402 (as described above in reference to FIGS. 1, 2, 4, and 6, respectively), electronic devices 104A-104F and/or electronic device 204 (as described above in reference to FIGS. 1 and 2, respectively), and/or any of the sub-systems, components or sub-components respectively contained therein, may be implemented using one or more computers 700.

Computer 700 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 700 may be any type of computer, including a desktop computer, a server, etc.

Computer 700 includes one or more processors (also called central processing units, or CPUs), such as a processor 706. Processor 706 is connected to a communication infrastructure 702, such as a communication bus. In some embodiments, processor 706 can simultaneously operate multiple computing threads.

Computer 700 also includes a primary or main memory 708, such as random access memory (RAM). Main memory 708 has stored therein control logic 724 (computer software), and data.

Computer 700 also includes one or more secondary storage devices 710. Secondary storage devices 710 include, for example, a hard disk drive 712 and/or a removable storage device or drive 714, as well as other types of storage devices, such as memory cards and memory sticks. For instance, computer 700 may include an industry standard interface, such a universal serial bus (USB) interface for interfacing with devices such as a memory stick. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 718 having stored therein computer software 726 (control logic) and/or data. Removable storage unit 716 represents a floppy disk, magnetic tape, compact disk, DVD, optical storage disk, or any other computer data storage device. Removable storage drive 714 reads from and/or writes to removable storage unit 716 in a well-known manner.

Computer 700 also includes input/output/display devices 704, such as touchscreens, LED and LCD displays, monitors, keyboards, pointing devices, etc.

Computer 700 further includes a communication or network interface 718. Communication interface 720 enables computer 700 to communicate with remote devices. For example, communication interface 720 allows computer 700 to communicate over communication networks or mediums 722 (representing a form of a computer useable or readable medium), such as LANs, WANs, the Internet, etc. Network interface 720 may interface with remote sites or networks via wired or wireless connections.

Control logic 728 may be transmitted to and from computer 700 via the communication medium 722.

Any apparatus or manufacture comprising a computer useable or readable medium having control logic (software) stored therein is referred to herein as a computer program product or program storage device. This includes, but is not limited to, computer 700, main memory 708, secondary storage devices 710, and removable storage unit 716. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

CONCLUSION

While various embodiments have been described above, it should be understood that they have been presented by way of example only, and not limitation. It will be apparent to persons skilled in the relevant art(s) that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method performed by a control device configured to control a plurality of electronic devices, comprising:
programming the control device to control at least a first one of the plurality of electronic devices via a first communication channel;
determining an identifier corresponding to the first one of the plurality of electronic devices based on said programming;
selecting a pairing sequence to be performed by at least the control device from a plurality of pairing sequences stored in a memory of the control device based on the identifier;
performing, at least in part, the selected pairing sequence between the control device and the first one of the plurality of electronic devices via the first communication channel, wherein the pairing sequence, when completed, enables the control device to control the first one of the plurality of electronic devices via a second communication channel; and
controlling the first one of the plurality of electronic devices using the control device via the second communication channel upon completion of the pairing sequence.

2. The method of claim 1, wherein said performing is initiated by:
detecting activation of one or more interface elements of the control device.

3. The method of claim 1, wherein said performing is initiated upon selection, using the control device, of a menu option via a graphical user interface of the first one of the plurality of electronic devices, the menu option being configured to initiate the pairing sequence.

4. The method of claim 1, wherein the first communication channel is an infrared-based communication channel, and wherein the second communication channel is a radio-frequency (RF)-based communication channel.

5. The method of claim 4, wherein the RF-based communication channel is an RF4CE communication channel.

6. The method of claim 1, further comprising:
performing a second pairing sequence between the control device and a second one of the plurality of electronic devices via the first communication channel, wherein the second pairing sequence, when completed, enables the control device to control the second one of the plurality of electronic devices via the second communication channel; and
controlling the second one of the plurality of electronic devices using the control device via the second communication channel upon completion of the second pairing sequence.

7. The method of claim 6, further comprising:
switching from a first frequency at which the control device communicates with the first one of the plurality of electronic devices via the second communication channel to a second frequency at which the control device communicates with the second one of the plurality of electronic devices via the second communication channel.

8. The method of claim 1, wherein the control device is a remote control device.

9. A control device configured to control a plurality of electronic devices, comprising:
a first transmitter configured to communicate with the plurality of electronic devices via a first communication channel;
a second transmitter configured to communicate with the plurality of electronic devices via a second communication channel; and
control logic configured to:
program the control device to control at least a first one of the plurality of electronic devices via first commands transmitted by the first transmitter;
determine an identifier corresponding to the first one of the plurality of electronic devices based on said programming;
select a pairing sequence to be performed by at least the control device from a plurality of pairing sequences stored in a memory of the control device based on the identifier;
perform, at least in part, the selected pairing sequence between the control device and the first one of the plurality of electronic devices via second commands transmitted by the first transmitter, wherein the pairing sequence, when completed, enables the control device to control the first one of the plurality of electronic devices via third commands transmitted by the second transmitter; and
control the first one of the plurality of electronic devices using the third commands transmitted by the second transmitter upon completion of the pairing sequence.

10. The control device of claim 9, wherein the control logic is configured to initiate the pairing sequence by:
detecting activation of one or more interface elements of the control device.

11. The control device of claim 9, wherein the first communication channel is an infrared-based communication channel, and wherein the second communication channel is a radio-frequency (RF)-based communication channel.

12. The control device of claim 11, wherein the RF-based communication channel is an RF4CE communication channel.

13. The control device of claim 9, wherein the control logic is further configured to:
perform, at least in part, a second pairing sequence between the control device and a second one of the plurality of electronic devices via fourth control commands transmitted by the first transmitter, wherein the second pairing sequence, when completed, enables the control device to control the second one of the plurality of electronic devices via fifth control commands transmitted by the second transmitter; and
control the second one of the plurality of electronic devices using the fifth control commands transmitted by the second transmitter upon completion of the second pairing sequence.

14. The control device of claim 13, wherein the control logic is further configured to:
switch from a first frequency at which the second transmitter communicates with the first one of the plurality of electronic devices to a second frequency at which the second transmitter communicates with the second one of the plurality of electronic devices.

15. The control device of claim 9, wherein the control device is a remote control device.

16. A system, comprising:
one or more processors; and
a first memory containing computer-readable instructions, which, when executed by the one or more processors, cause the one or more processors to perform operations in a control device configured to control a plurality of electronic devices, the operations comprising:
programming the control device to control at least a first one of the plurality of electronic devices via a first communication channel;
determining an identifier corresponding to the first one of the plurality of electronic devices based on said programming;
selecting a pairing sequence to be performed by at least the control device from a plurality of pairing sequences stored in a second memory of the control device based on the identifier,
performing, at least in part, the selected pairing sequence between the control device and the first one of the plurality of electronic devices via the first communication channel, wherein the pairing sequence, when completed, enables the control device to control the first one of the plurality of electronic devices via a second communication channel; and controlling the first one of the plurality of electronic devices using the control device via the second communication channel upon completion of the pairing sequence.

17. The system of claim 16, wherein the first communication channel is an infrared-based communication channel, and wherein the second communication channel is a radio-frequency (RF)-based communication channel.

18. The system of claim 17, wherein the RF-based communication channel is an RF4CE communication channel.

19. A method performed by a control device configured to control a plurality of electronic devices, comprising:
   programming the control device to control at least a first one of the plurality of electronic devices via a first communication channel;
   performing, at least in part, a pairing sequence between the control device and the first one of the plurality of electronic devices via the first communication channel, wherein the pairing sequence, when completed, enables the control device to control the first one of the plurality of electronic devices via a second communication channel;
   controlling the first one of the plurality of electronic devices using the control device via the second communication channel upon completion of the pairing sequence;
   performing a second pairing sequence between the control device and a second one of the plurality of electronic devices via the first communication channel, wherein the second pairing sequence, when completed, enables the control device to control the second one of the plurality of electronic devices via the second communication channel;
   controlling the second one of the plurality of electronic devices using the control device via the second communication channel upon completion of the second pairing sequence; and
   switching from a first frequency at which the control device communicates with the first one of the plurality of electronic devices via the second communication channel to a second frequency at which the control device communicates with the second one of the plurality of electronic devices via the second communication channel.

20. A control device configured to control a plurality of electronic devices, comprising:
   a first transmitter configured to communicate with the plurality of electronic devices via a first communication channel;
   a second transmitter configured to communicate with the plurality of electronic devices via a second communication channel; and
   control logic configured to:
      program the control device to control at least a first one of the plurality of electronic devices via first commands transmitted by the first transmitter;
      perform, at least in part, a pairing sequence between the control device and the first one of the plurality of electronic devices via second commands transmitted by the first transmitter, wherein the pairing sequence, when completed, enables the control device to control the first one of the plurality of electronic devices via third commands transmitted by the second transmitter;
      control the first one of the plurality of electronic devices using the third commands transmitted by the second transmitter upon completion of the pairing sequence;
      perform, at least in part, a second pairing sequence between the control device and a second one of the plurality of electronic devices via fourth control commands transmitted by the first transmitter, wherein the second pairing sequence, when completed, enables the control device to control the second one of the plurality of electronic devices via fifth control commands transmitted by the second transmitter;
      control the second one of the plurality of electronic devices using the fifth control commands transmitted by the second transmitter upon completion of the second pairing sequence; and
      switch from a first frequency at which the second transmitter communicates with the first one of the plurality of electronic devices to a second frequency at which the second transmitter communicates with the second one of the plurality of electronic devices.

* * * * *

UNITED STATES PATENT AND TRADEMARK OFFICE
CERTIFICATE OF CORRECTION

PATENT NO. : 9,898,926 B2
APPLICATION NO. : 15/043257
DATED : February 20, 2018
INVENTOR(S) : Syed R. Naqvi It is certified that error appears in the above-identified patent and that said Letters Patent is hereby corrected as shown below:

In the Claims

In Column 20, Line 59, in Claim 16, delete "identifier," and insert -- identifier; --, therefor.

Signed and Sealed this
Twenty-fourth Day of April, 2018

Andrei Iancu
*Director of the United States Patent and Trademark Office*